United States Patent
Huang et al.

(10) Patent No.: US 11,853,508 B2
(45) Date of Patent: Dec. 26, 2023

(54) TOUCH PANEL AND TOUCH DEVICE

(71) Applicant: Huizhou China Star Optoelectronics Display Co., Ltd., Guangdong (CN)

(72) Inventors: Dongchen Huang, Guangdong (CN); Yuexia Lin, Guangdong (CN); Yinghui Wu, Guangdong (CN)

(73) Assignee: Huizhou China Star Optoelectronics Display Co., Ltd., Huizhou (CN)

( * ) Notice: Subject to any disclaimer, the term of this patent is extended or adjusted under 35 U.S.C. 154(b) by 208 days.

(21) Appl. No.: 17/427,184

(22) PCT Filed: May 27, 2021

(86) PCT No.: PCT/CN2021/096483
§ 371 (c)(1),
(2) Date: Jul. 30, 2021

(87) PCT Pub. No.: WO2022/178993
PCT Pub. Date: Sep. 1, 2022

(65) Prior Publication Data
US 2023/0161438 A1  May 25, 2023

(30) Foreign Application Priority Data
Feb. 25, 2021 (CN) .......................... 202110211063.1

(51) Int. Cl.
*G06F 3/041* (2006.01)
*G06F 3/044* (2006.01)

(52) U.S. Cl.
CPC .......... *G06F 3/0418* (2013.01); *G06F 3/0443* (2019.05); *G06F 3/04164* (2019.05); *G06F 2203/04112* (2013.01)

(58) Field of Classification Search
CPC .. G06F 3/0418; G06F 3/04164; G06F 3/0443; G06F 2203/04112
See application file for complete search history.

(56) References Cited

U.S. PATENT DOCUMENTS

| | | | | |
|---|---|---|---|---|
| 3,052,879 | A * | 9/1962 | McLaughlin | G06F 3/0442 341/11 |
| 8,614,680 | B2 * | 12/2013 | Lin | G06F 3/0446 345/173 |
| 11,061,266 | B2 * | 7/2021 | Wang | G06F 3/0446 |
| 11,481,064 | B2 * | 10/2022 | Jeong | G06F 3/04164 |
| 11,526,225 | B2 * | 12/2022 | Wang | G06F 3/0446 |

(Continued)

FOREIGN PATENT DOCUMENTS

| | | |
|---|---|---|
| CN | 203250289 | 10/2013 |
| CN | 104699349 | 6/2015 |

(Continued)

*Primary Examiner* — Benyam Ketema

(57) ABSTRACT

A touch panel and a touch device are provided. The touch panel includes a touch region and a bezel region. The touch region includes a plurality of transmit channels. The bezel region is disposed on an edge of the touch region. The bezel region includes a plurality of first traces, a plurality of second traces, and a plurality of conductive film layers. One of the conductive film layers connects one of the first traces and one of the second traces. The first trace and the second trace connected in parallel are connected to one of the transmit channels. A trace impedance of the bezel region in the touch panel can be reduced.

18 Claims, 3 Drawing Sheets

(56) References Cited

U.S. PATENT DOCUMENTS

| | | | | |
|---|---|---|---|---|
| 11,537,250 B2* | 12/2022 | Yin | | G06F 3/04164 |
| 11,579,734 B2* | 2/2023 | Choi | | G06F 3/0443 |
| 2007/0062739 A1* | 3/2007 | Philipp | | G06F 3/0443 |
| | | | | 178/18.06 |
| 2010/0065342 A1* | 3/2010 | Shaikh | | G06F 3/0445 |
| | | | | 345/173 |
| 2010/0066709 A1* | 3/2010 | Yajima | | H05K 1/117 |
| | | | | 174/262 |
| 2011/0090175 A1* | 4/2011 | Mamba | | G06F 3/0412 |
| | | | | 345/174 |
| 2011/0102364 A1* | 5/2011 | Lin | | G06F 3/0445 |
| | | | | 345/174 |
| 2011/0210934 A1* | 9/2011 | Lee | | G06F 3/0446 |
| | | | | 345/173 |
| 2011/0242017 A1* | 10/2011 | Kang | | G06F 3/045 |
| | | | | 345/173 |
| 2011/0298739 A1* | 12/2011 | Wu | | H05K 1/0306 |
| | | | | 345/173 |
| 2012/0098787 A1* | 4/2012 | Kim | | G06F 3/0446 |
| | | | | 345/174 |
| 2013/0169597 A1* | 7/2013 | Yin | | G06F 3/0446 |
| | | | | 345/175 |
| 2013/0293791 A1* | 11/2013 | Abe | | G02F 1/136286 |
| | | | | 349/12 |
| 2014/0182894 A1* | 7/2014 | Liu | | G06F 3/04164 |
| | | | | 174/251 |
| 2014/0285728 A1* | 9/2014 | Lee | | G06F 3/041 |
| | | | | 349/12 |
| 2016/0070394 A1* | 3/2016 | Van Ostrand | | G06F 3/047 |
| | | | | 345/173 |
| 2016/0202833 A1* | 7/2016 | Kim | | G06F 3/0443 |
| | | | | 345/173 |
| 2016/0293631 A1* | 10/2016 | Sun | | G06F 3/041 |
| 2016/0300863 A1* | 10/2016 | Koide | | H01L 27/1244 |
| 2017/0262102 A1* | 9/2017 | Mizuhashi | | G06F 3/0412 |
| 2017/0277313 A1* | 9/2017 | Lee | | G06F 3/0412 |
| 2018/0182822 A1* | 6/2018 | Seo | | G06F 3/0412 |
| 2018/0308903 A1* | 10/2018 | Jeong | | G06F 3/0443 |
| 2018/0348913 A1* | 12/2018 | Lee | | G06F 3/0412 |
| 2018/0350884 A1* | 12/2018 | Won | | G06F 3/0412 |
| 2019/0014664 A1* | 1/2019 | Ahn | | H10K 59/131 |
| 2019/0258345 A1* | 8/2019 | Lin | | G06F 3/044 |
| 2020/0089384 A1* | 3/2020 | Wang | | G06F 3/04164 |
| 2020/0286961 A1* | 9/2020 | Jeong | | H10K 50/86 |
| 2021/0242284 A1* | 8/2021 | Kim | | G06F 3/0445 |
| 2021/0271367 A1* | 9/2021 | Park | | G06F 3/0412 |

FOREIGN PATENT DOCUMENTS

| | | |
|---|---|---|
| CN | 106249979 | 12/2016 |
| CN | 106648213 | 5/2017 |
| CN | 108389869 | 8/2018 |
| CN | 109872632 | 6/2019 |
| CN | 109933234 | 6/2019 |
| CN | 111063257 | 4/2020 |
| CN | 210323695 | 4/2020 |
| CN | 112327551 | 2/2021 |
| CN | 112783377 | 5/2021 |

* cited by examiner

TOUCH PANEL AND TOUCH DEVICE

RELATED APPLICATIONS

This application is a National Phase of PCT Patent Application No. PCT/CN2021/096483 having International filing date of May 27, 2021, which claims the benefit of priority of Chinese Patent Application No. 202110211063.1 filed on Feb. 25, 2021. The contents of the above applications are all incorporated by reference as if fully set forth herein in their entirety.

FIELD AND BACKGROUND OF THE INVENTION

The present disclosure relates to the field of touch technologies, in particular to a touch panel and a touch device.

In a metal mesh touch, an impedance of a channel is mainly composed of two parts, one is an impedance of an in-plane channel, and the other is a trace impedance of a bezel region. The trace impedance of the bezel region is a main impedance in the metal mesh. Too high of the trace impedance will affect a response time of a touch operation, which in turn will reduce a touch performance.

SUMMARY OF THE INVENTION

A trace impedance of a bezel region is a main impedance in a metal mesh. If the trace impedance is too high, it will affect a response time of a touch operation and cause a touch performance to decrease.

Embodiments of the present disclosure provide a touch panel and a touch device, which can reduce a trace impedance of a bezel region, improve a response speed of a touch operation, and thus improve a touch performance.

In a first aspect, an embodiment of the present disclosure provides a touch panel, including:
 a touch region including a plurality of transmit channels; and
 a bezel region disposed on an edge of the touch region. The bezel region comprises a plurality of first traces, a plurality of second traces, and a plurality of conductive film layers arranged at intervals, one of the conductive film layers connects one of the first traces and one of the second traces so that the first trace and the second trace are connected in parallel, and the first trace and the second trace connected in parallel are connected to one of the transmit channels.

In a second aspect, an embodiment of the present disclosure also provides a touch device, and the touch device includes the touch panel described in any one of the above.

In the embodiments of the present disclosure, the touch panel includes the touch region and the bezel region. The touch region includes the plurality of transmit channels. The bezel region is disposed on the edge of the touch region. The bezel region includes the plurality of first traces, the plurality of second traces, and the plurality of conductive film layers arranged at intervals. One of the conductive film layers connects one of the first traces and one of the second traces so that the first trace and the second trace are connected in parallel. The first trace and the second trace connected in parallel are connected to one of the transmit channels. By arranging parallel first trace and second trace at a wiring end of each transmit channel, a trace impedance of the bezel region in the touch panel can be reduced, and a response speed of a touch operation and a touch performance of the touch panel can be improved.

BRIEF DESCRIPTION OF THE SEVERAL VIEWS OF THE DRAWINGS

In order to more clearly describe technical solutions in the embodiments of the present disclosure, the following will briefly introduce drawings needed in the description of the embodiments. Apparently, the drawings in the following description are only some embodiments of the present disclosure. For those skilled in the art, without creative efforts, other drawings can be obtained based on these drawings.

In order to have a more complete understanding of the present disclosure and its beneficial effects, it will be described below in conjunction with the accompanying drawings. In the following description, the same reference numerals indicate the same parts.

DESCRIPTION OF SPECIFIC EMBODIMENTS OF THE INVENTION

The technical solutions in the embodiments of the present disclosure will be clearly and completely described below in conjunction with the drawings in the embodiments of the present disclosure. Apparently, the described embodiments are only a part of the embodiments of the present disclosure, rather than all of the embodiments. Based on the embodiments in the present disclosure, all other embodiments obtained by those skilled in the art without creative efforts shall fall within a protection scope of the present disclosure.

An embodiment of the present disclosure provides a touch panel. The touch panel is configured to touch operations. That is, a user performs operations, such as a pressing operation on a touch panel, and the touch panel can feed back a signal of the pressing operation, so that a touch device installed with the touch panel can control display or playback of the touch device according to the signal of the pressing operation.

Figure 1:
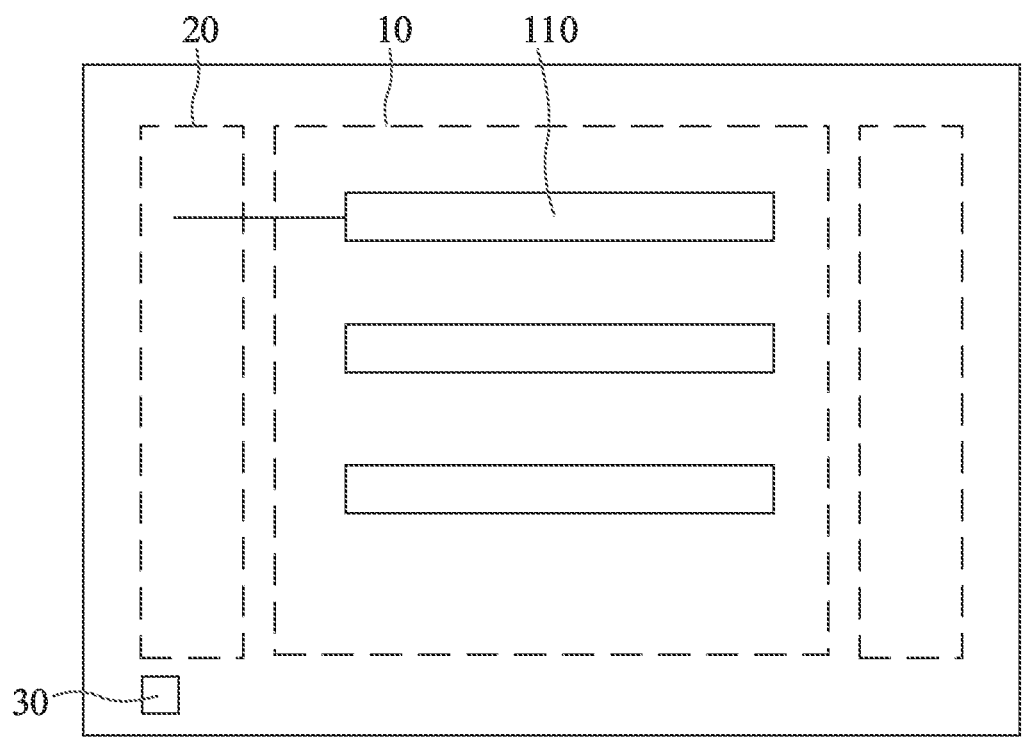
FIG. 1 is a schematic diagram of a touch panel of an embodiment of the present disclosure.

Exemplarily, refer to FIG. 1, which is a schematic diagram of a touch panel of an embodiment of the present disclosure. The embodiment of the present disclosure provides a touch panel 100. The touch panel 100 includes a touch region 10, bezel regions 20, and a metal connection element 30. It should be noted that the touch region 10 includes a first edge and a second edge that are arranged oppositely, that is, a left edge and a right edge of the touch region 10 in FIG. 1. The touch panel 100 may include two bezel regions 20. One bezel region 20 is disposed on the left edge of the touch region 10, and the other bezel region 20 is disposed on the right edge of the touch region 10. The metal connection element 30 can be placed in any suitable position of the touch panel 100, and it is not limited here. For convenience of description, the embodiment of the present disclosure is described in that the metal connection element 30 is arranged at a position corresponding to the bezel region 20.

The touch region 10 includes a plurality of transmit channels 110. The plurality of transmit channels 110 are arranged side by side on a same layer. Traces in each transmit channel 110 can be formed in a metal mesh structure. Since any touch region 10 of the touch panel 100 can realize sensing of a touch operation, forming the transmit channels 110 to the metal mesh structure can make the transmit channels 110 have a wide distribution range. On the other hand, an impedance of the metal mesh structure of the transmit channels 110 is lower than that of a conventional structure of the transmit channels. In the conventional structure, for example, the traces in the transmit channels are a plurality of metal traces that are not connected in parallel and are arranged side by side. The metal mesh structure can realize a parallel connection of the plurality of metal traces, which can reduce a trace impedance, thereby improving a response speed of the touch panel 100 and improving a touch performance.

In a metal mesh touch, an impedance of a channel is mainly composed of a channel impedance in the touch region 10 and a trace impedance of the bezel region 20, that is:

$$R_{TX} = R_{ch} + R_{trace}$$

$R_{TX}$ represents the impedance of the channel;
$R_{ch}$ represents the channel impedance in the touch region 10;
$R_{trace}$ represents a total trace impedance of the bezel region 20.

For the traces of bezel region 20, a total impedance of the traces in one side is: $R_{trace} = 2*R_s*W/W_{line}$. A total impedance of the traces in three sides is: $R_{trace} = R_s*W/W_{line}$.

$R_s$ is a square resistance of each trace;
W is a width of the bezel region 20;
$W_{line}$ is a width of the trace.

In other words, no matter how the traces are arranged, the total trace impedance $R_{trace}$ of the bezel region 20 is related to the square resistance of each trace. Moreover, the higher the square resistance of the trace, the larger the total trace resistance $R_{trace}$ of the bezel region 20. Too high impedance will increase a charging time of a touch capacitor, and the response speed of the touch operation will decrease accordingly. Therefore, the trace impedance of the bezel region 20 needs to be optimized. The embodiment of the present disclosure provides an optimized structure of the trace impedance of the bezel region 20, which will be described below.

In order to fully understand a structure of the bezel region 20 of the touch panel 100 in the embodiment of the present disclosure, the bezel region 20 will be described in detail below.

Figure 2:
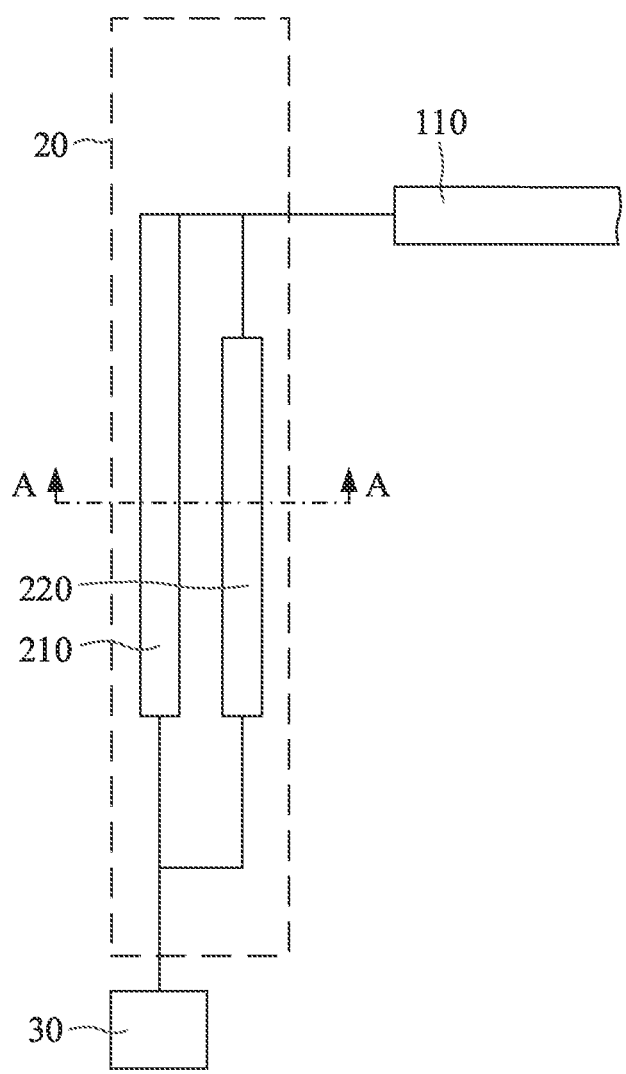
FIG. 2 is a schematic diagram of a structure of a bezel region in the touch panel of FIG. 1.
Figure 3:
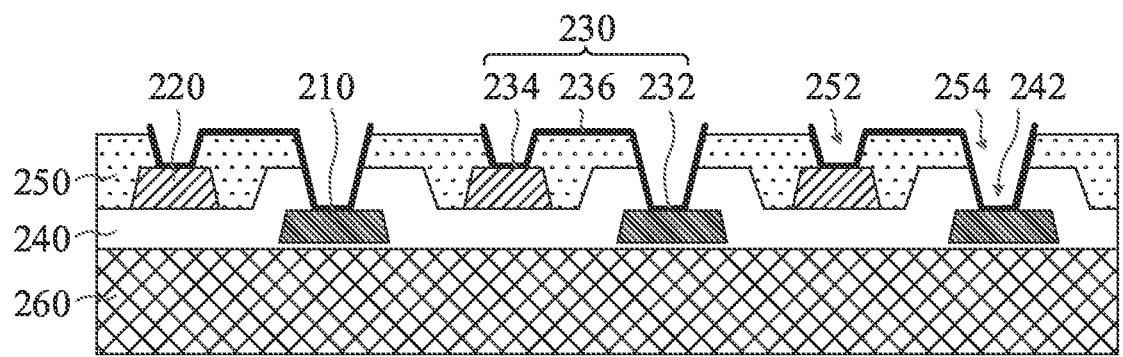
FIG. 3 is a cross-sectional view of the bezel region of FIG. 2 along a line A-A.

For details, referring to FIG. 2 and FIG. 3, FIG. 2 is a schematic diagram of a structure of a bezel region in the touch panel of FIG. 1, and FIG. 3 is a cross-sectional view of the bezel region of FIG. 2 along a line A-A. The bezel region 20 includes a plurality of first traces 210, a plurality of second traces 220, and a plurality of conductive film layers 230 arranged at intervals. One of the conductive film layers 230 connects one of the first traces 210 and one of the second traces 220, so that the corresponding first trace 210 and second trace 220 are connected in parallel. The first trace 210 and the second trace 220 connected in parallel are connected to one of the transmit channels 110. By setting the first trace 210 and second trace 220 in parallel on a trace end of each transmit channel 110, the trace impedance of the bezel region 20 in the touch panel 100 can be reduced, and the response speed of the touch operation and the touch performance of the touch panel can be improved.

Two ends of the first trace 210 and the second trace 220 connected in parallel are respectively connected to the corresponding transmit channel 110 and the metal connection element 30, so that the transmit channel 110 is connected to the metal connection element 30 through the first trace 210 and second trace 220 connected in parallel. The metal connection element 30 is connected to a touch chip, so that control signals, such as judgment, feedback, and control signals, of the touch chip are transmitted to the transmit channel 110 through the first trace 210 and the second trace 220.

One of the first traces 210 is disposed between two of the second traces 220. The plurality of first traces 210 are arranged on a same plane at intervals. Alternatively, a distance between two adjacent first traces 210 is equal. The plurality of second traces 220 are arranged on a same plane at intervals. Alternatively, a distance between two adjacent second traces 220 is equal. It should be noted that the plane where the first traces 210 is located and the plane where the second traces 220 is located are parallel and non-overlapping planes. That is, the first traces 210 and the second traces 220 can be arranged in different layers. Alternatively, the distance between two adjacent second traces 220 is greater than the distance between two adjacent first traces 210.

A distance between a projection of one first trace 210 on a plane formed by the plurality of second traces 220 and two adjacent second traces 220 ranges from 2 micrometers to 3 micrometers. In this way, the first traces 210 and the second traces 220 do not overlap each other and thus achieve insulation from each other. Moreover, the small distance between the first traces 210 and the second traces 220 can save a material of the conductive film layers 230.

It should be noted that a width of the first trace 210 may range from 3 micrometers to 10 micrometers. A thickness of the first trace 210 may range from 0.2 micrometers to 0.7 micrometers. A width of the second trace 220 may range from 3 micrometers to 10 micrometers. A thickness of the second trace 220 may range from 0.2 micrometers to 0.7 micrometers. Setting the first trace 210 and the second trace 220 to flat and wide line shapes can ensure conductivities of the first trace 210 and the second trace 220 when the thickness of the trace is small.

Both the first trace 210 and the second trace 220 may be made of metal. Preferably, they may be made of metal with lower impedance. For example, the first trace 210 and the second trace 220 are made of a silver material. In addition, the first trace 210 and the second trace 220 are both metal mesh structures.

It should be noted that an impedance of the second trace 220 and an impedance of the first trace 210 may be equal or not equal. If the impedance of the second trace 220 is less than or equal to the impedance of the first trace 210, the impedance of the second trace 220 and the impedance of the first trace 210 in parallel are smaller. That is, the trace impedance of bezel region 20 is more obviously reduced, the touch response speed is higher, and the touch performance is better.

In order to further illustrate positions and connection relationships between the first trace 210 and the second trace 220 of the bezel region 20 and the conductive film layers 230, following specific descriptions will be made with reference to the cross-sectional view of the bezel region 20 in FIG. 3 along the line A-A.

The bezel region 20 includes a glass layer 260, a first insulating layer 240, and a second insulating layer 250 that are sequentially stacked. A plurality of the first traces 210 are arranged on one side of the first insulating layer 240 at intervals. A plurality of the second traces 220 are arranged on the other side of the first insulating layer 240 at intervals. One side of the first insulating layer 240 and the other side of the first insulating layer 240 are arranged opposite to each other. It can be understood that one side of the first insulating layer 240 includes a plane where the plurality of first traces 210 are set. The other side of the first insulating layer 240 includes another plane where the plurality of second traces 220 are set. That is, there is a setting plane on each side of the first insulating layer 240.

The first insulating layer 240 is provided with a plurality of first via holes 242. The second insulating layer 250 is provided on the plurality of second traces 220. The second insulating layer 250 is provided with a plurality of second via holes 252 and a plurality of third via holes 254. One of the third via holes 254 is formed between two of the second via holes 252. One of the third via holes 254 is connected to one of the first via holes 242. One of the conductive film layers 230 connects on the plurality of the first traces 210 and on the plurality of the second traces 220 through on the plurality of the first via holes 242, on the plurality of the second via holes 252, and on the plurality of the third via holes 254.

A sum of depths of the first via hole 242 and the connected third via hole 254 is greater than a depth of the second via hole 252. It is understandable that since the first via hole 242 and the connected third via hole 254 are formed to extend from the second insulating layer 250 to the first insulating layer 240, and the second via hole 252 only perforates the second insulating layer 250, the sum of the depths of the first via hole 242 and the connected third via hole 254 is greater than the depth of the second via hole 252.

It should be noted that when making the traces, the insulating layer, and the glass layer 260 of the touch panel 100, following steps can be performed. A layer of the glass layer 260 is provided, and then a layer of metal mesh trace is formed. The plurality of transmit channels 110 and the plurality of first traces 210 that are arranged at intervals are obtained through a photolithography process. One of the first traces 210 is correspondingly connected to one of the transmit channels 110. Then, a layer of the first insulating layer 240 is coated, and then a layer of metal mesh trace is formed. A plurality of sensing channels and the plurality of second traces 220 that are arranged at intervals are obtained through the photolithography process. The second traces 220 are insulated from the sensing channels. Then, the second insulating layer 250 is coated. Finally, the first via holes 242 and the third via holes 254 are formed at corresponding positions of the first traces 210, and the second via holes 252 are formed at corresponding positions of the second traces 220. The conductive film layer 230 connects the first trace 210 and the second trace 220 through the first via hole 242, the third via hole 254, and the second via hole 252. It can be understood that two ends of the conductive film layer 230 are respectively connected to the transmit channel 110 and the metal connection element 30.

It should be noted that the touch panel 100 usually includes a transmit channel layer and a sensing channel layer that are stacked and insulated. Existing touch panels usually do not reserve second traces 220 when forming sensing channels. The embodiments of the present disclosure reserve the second traces 220 when fabricating the sensing channel layer. Moreover, the second traces 220 and the first traces 210 are connected in parallel through the conductive film layers 230. At this time, $R_{trace-new}=\frac{1}{2}*R_{trace}$. In comparison with a traditional trace pattern which only includes the first traces 210, the embodiments of the present disclosure increase conductive paths of the traces. Therefore, the impedance of the traces in the bezel region can be reduced, the touch response speed can be improved, and the touch performance can be improved.

Positions of the first insulating layer 240 corresponding to the first traces 210 can form a plurality of protrusions during production, because the formation of the plurality of first traces 210 will make a surface after coating the first insulating layer 240 uneven. Similarly, positions of the second insulating layer 250 corresponding to the second traces 220 will also form a plurality of protrusions. In addition, since the first via holes 242 are formed at the positions of the first insulating layer 240 corresponding to the first traces 210, the second via holes 252 are formed at the positions of the second insulating layer 250 corresponding to the second traces 220, and the third via holes 254 are formed at the positions of the second insulating layer 250 corresponding to the first via holes 242, structures of the first insulating layer 240 and the second insulating layer 250 shown in FIG. 3 are formed.

The conductive film layer 230 includes a first section 232, a second section 234, and a third section 236. The first section 232 is disposed on a wall of the first via hole 242 and a wall of the third via hole 254. The second section is disposed on a wall of the second via hole 252. The third section 236 is disposed on the second insulating layer 250, and the third section 236 connects the first section 232 and the second section 234.

The conductive film layers 230 may be made of high light-transmitting materials, such as transparent indium tin oxide (ITO) materials. It should be noted that if the conductive film layers 230 are manufactured, an ITO film can be coated on the conductive glass to form the conductive film layers 230.

Figure 4:
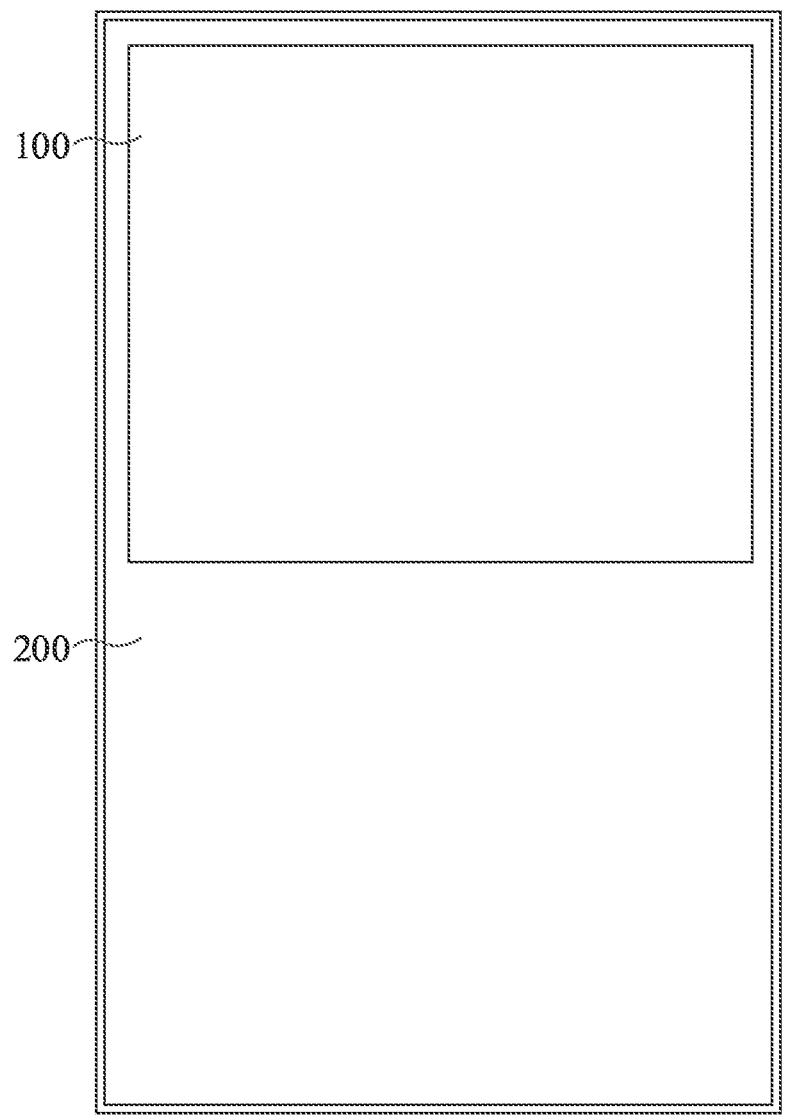
FIG. 4 is a schematic diagram of a touch device of an embodiment of the present disclosure.

In some embodiments, please refer to FIG. 4, which is a schematic diagram of a touch device of an embodiment of the present disclosure. The embodiment of the present disclosure provides a touch device 1000. The touch device 1000 includes the touch panel 100 and a display panel 200. The display panel 200 at least partially overlaps the touch panel 100. That is, an area of the display panel 200 is greater than or equal to an area of the touch panel 100. For example, as shown in FIG. 4, the touch panel 100 and the display panel 200 partially overlap. In order to enable touch operations in all regions of the display panel 200, preferably, the touch panel 100 overlaps the display panel 200. That is, the area of the touch panel 100 is equal to the area of the display panel 200. The structure of the touch panel 100 can refer to the structure of the touch panel 100 described in the foregoing embodiments, which will not be repeated here.

The touch device in the embodiments of the present disclosure may be a mobile terminal such as a mobile phone or a tablet computer. The touch device may also be a device with a touch panel, such as a gaming equipment, an augmented reality (AR) equipment, a virtual reality (VR) equipment, an in-vehicle computer, a laptop, a data storage device, an audio playback device, a video playback device, a wearable device, etc. The wearable device may be a smart bracelet, smart glasses, etc.

In the foregoing embodiments, the description of each embodiment has its own focus. For a part that is not described in detail in some embodiments, reference may be made to related descriptions of other embodiments.

In the description of the present disclosure, terms, such as "first" and "second", are only used for descriptive purposes, and cannot be understood as indicating or implying relative importance or implicitly indicating a number of indicated technical features. Thus, features defined as "first" and "second" may explicitly or implicitly include one or more plurality of features. It should be understood that the "plurality of" mentioned in this specification refers to two or more.

The touch panel and the touch device of the embodiments of the present disclosure have been described in detail above. In this specification, specific examples are used to illustrate principles and implementations of the present disclosure. The description of the above embodiments is only used to help understand methods and core ideas of the present disclosure. Also, for those skilled in the art, based on the ideas of the present disclosure, there will be changes in the specific implementations and the scope of application. In summary, the content of this specification should not be construed as a restriction on the present disclosure.

What is claimed is:

1. A touch panel, comprising:
    a touch region comprising a plurality of transmit channels; and
    a bezel region disposed on an edge of the touch region, wherein the bezel region comprises a plurality of first traces, a plurality of second traces, and a plurality of conductive film layers arranged at intervals, one of the conductive film layers connects one of the first traces and one of the second traces so that the first trace and the second trace are connected in parallel, and the first trace and the second trace connected in parallel are connected to one of the transmit channels;
    wherein the bezel region further comprises:
    a first insulating layer, wherein the plurality of the first traces are arranged at intervals on one side of the first insulating layer, the plurality of the second traces are arranged at intervals on the other side of the first insulating layer, one side of the first insulating layer and the other side of the first insulating layer are arranged opposite to each other, and the first insulating layer is provided with a plurality of first via holes; and
    a second insulating layer disposed on the plurality of second traces, wherein the second insulating layer is provided with a plurality of second via holes and a plurality of third via holes, one of the third via holes is disposed between two of the second via holes, and one of the third via holes is connected to one of the first via holes; and
    wherein one of the conductive film layers is connected to one of the first traces and one of the second traces through one of the first via holes, one of the second via holes, and one of the third via holes.

2. The touch panel according to claim 1, wherein an impedance of the second trace is less than or equal to an impedance of the first trace.

3. The touch panel according to claim 1, wherein one of the first traces is disposed between two of the second traces.

4. The touch panel according to claim 3, wherein a distance between a projection of each of the first traces on a plane formed by the plurality of second traces and any one of the adjacent second traces ranges from 2 micrometers to 3 micrometers.

5. The touch panel according to claim 1, wherein a sum of depths of the first via hole and the connected third via hole is greater than a depth of the second via hole.

6. The touch panel according to claim 1, wherein one of the conductive film layers comprises a first section, a second section, and a third section, the first section is disposed on a wall of the first via hole and a wall of the third via hole, the second section is disposed on a wall of the second via hole, the third section is disposed on the second insulating layer, and the third section connects the first section and the second section.

7. The touch panel according to claim 1, wherein the bezel region further comprises a glass layer, and the glass layer, the first insulating layer, and the second insulating layer are stacked in sequence.

8. The touch panel according to claim 7, wherein the touch panel further comprises a metal connection element, and the first trace and the second trace connected in parallel are connected between the corresponding transmit channel and the metal connection element.

9. The touch panel according to claim 1, wherein widths of the first trace and the second trace range from 3 micrometers to 10 micrometers.

10. The touch panel according to claim 1, wherein thicknesses of the first trace and the second trace range from 0.2 micrometers to 0.7 micrometers.

11. The touch panel according to claim 1, wherein a distance between two adjacent first traces is equal.

12. The touch panel according to claim 11, wherein a distance between two adjacent second traces is equal.

13. The touch panel according to claim 12, wherein the distance between two adjacent second traces is greater than the distance between two adjacent first traces.

14. A touch device, comprising a touch panel, wherein the touch panel comprises:
    a touch region comprising a plurality of transmit channels; and
    a bezel region disposed on an edge of the touch region, wherein the bezel region comprises a plurality of first traces, a plurality of second traces, and a plurality of conductive film layers arranged at intervals, one of the conductive film layers connects one of the first traces and one of the second traces so that the first trace and the second trace are connected in parallel, and the first trace and the second trace connected in parallel are connected to one of the transmit channels;
    wherein the bezel region further comprises:
    a first insulating layer, wherein the plurality of the first traces are arranged at intervals on one side of the first insulating layer, the plurality of the second traces are arranged at intervals on the other side of the first insulating layer, one side of the first insulating layer and the other side of the first insulating layer are arranged opposite to each other, and the first insulating layer is provided with a plurality of first via holes; and
    a second insulating layer disposed on the plurality of second traces, wherein the second insulating layer is provided with a plurality of second via holes and a plurality of third via holes, one of the third via holes is disposed between two of the second via holes, and one of the third via holes is connected to one of the first via holes; and
    wherein one of the conductive film layers is connected to one of the first traces and one of the second traces through one of the first via holes, one of the second via holes, and one of the third via holes.

15. The touch device according to claim 14, wherein an impedance of the second trace is less than or equal to an impedance of the first trace.

16. The touch device according to claim 14, wherein one of the first traces is disposed between two of the second traces, and a distance between a projection of each of the first traces on a plane formed by the plurality of second traces and any one of the adjacent second traces ranges from 2 micrometers to 3 micrometers.

17. The touch device according to claim 16, wherein a sum of depths of the first via hole and the connected third via hole is greater than a depth of the second via hole.

18. The touch device according to claim 16, wherein one of the conductive film layers comprises a first section, a second section, and a third section, the first section is disposed on a wall of the first via hole and a wall of the third via hole, the second section is disposed on a wall of the second via hole, the third section is disposed on the second insulating layer, and the third section connects the first section and the second section.

* * * * *